US006631658B2

(12) United States Patent
Brown

(10) Patent No.: US 6,631,658 B2
(45) Date of Patent: Oct. 14, 2003

(54) SAW SHARPENING MACHINE WITH PITCH PRE-MEASUREMENT AND FEEDBACK CONTROL FOR SAW BLADE INDEXING

(75) Inventor: Ernest W. Brown, Texarkana, AK (US)

(73) Assignee: Pacific/Hoe Saw & Knife Company, Portland, OR (US)

( * ) Notice: Subject to any disclaimer, the term of this patent is extended or adjusted under 35 U.S.C. 154(b) by 2 days.

(21) Appl. No.: 10/028,565

(22) Filed: Dec. 21, 2001

(65) Prior Publication Data

US 2002/0078796 A1 Jun. 27, 2002

Related U.S. Application Data

(60) Provisional application No. 60/257,401, filed on Dec. 22, 2000.

(51) Int. Cl.[7] ............................................... B23D 63/12
(52) U.S. Cl. ........................ 76/37; 76/40; 76/75; 76/77
(58) Field of Search ............................... 76/37, 40, 77, 76/75, 25.1

(56) References Cited

U.S. PATENT DOCUMENTS

| 4,348,838 A | * | 9/1982 | Tacchella ................... 76/37 X |
| 4,418,589 A | | 12/1983 | Cowart, Sr. .................... 76/112 |
| 4,436,000 A | | 3/1984 | Lenard et al. ................. 76/41 |
| 4,587,867 A | | 5/1986 | Pokorny et al. ............ 76/25 R |
| 4,819,515 A | | 4/1989 | Pfaltzgraff ..................... 76/41 |
| 5,048,236 A | | 9/1991 | Williams .................. 51/77 BS |
| 5,471,897 A | | 12/1995 | Wright ............................ 76/37 |
| 5,488,884 A | | 2/1996 | Andrianoff et al. ............ 76/41 |
| 5,503,046 A | | 4/1996 | Emter ............................ 76/77 |
| 5,890,401 A | | 4/1999 | Hensinger et al. .............. 76/41 |
| 6,109,137 A | | 8/2000 | Lenard et al. .................. 76/37 |
| 6,374,703 B1 | | 4/2002 | Schurb et al. .................. 76/40 |

OTHER PUBLICATIONS

International Search Report for International No. PCT/US01/50286 dated Jun. 5, 2002.

* cited by examiner

*Primary Examiner*—Douglas D. Watts
(74) *Attorney, Agent, or Firm*—Stoel Rives LLP

(57) ABSTRACT

A band saw profiling machine includes an indexing mechanism having a feed finger mechanically linked to a caliper finger for reciprocating movement therewith. The caliper finger is urged toward the feed finger during an indexing movement of the indexing mechanism to measure the spacing between adjacent teeth of a band saw blade on-the-fly and concurrently with advancement and sharpening of the saw blade. The tooth spacing measurement is then used in the band saw sharpening machine to provide feedback for a subsequent indexing movement of the indexing mechanism, to accurately position the band saw blade for sharpening of a row of teeth. A control unit of the sharpening machine accepts input of shape factors from an operator that define the pattern of motion of the indexing mechanism, the grinding wheel, or both, for sharpening of irregular tooth shapes.

31 Claims, 11 Drawing Sheets

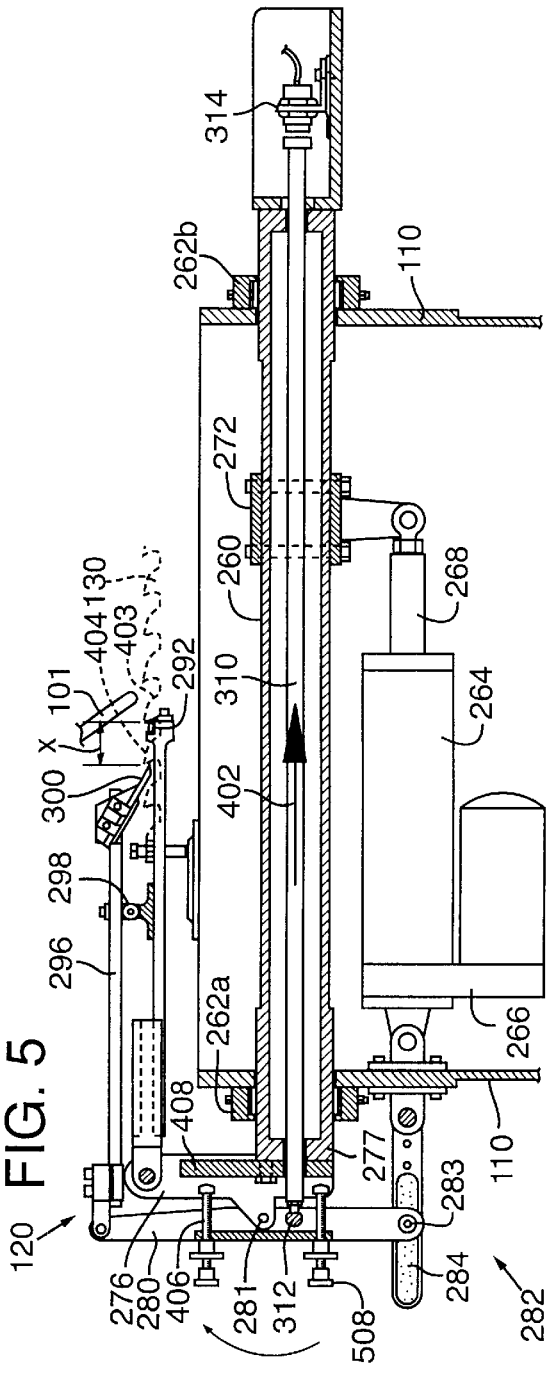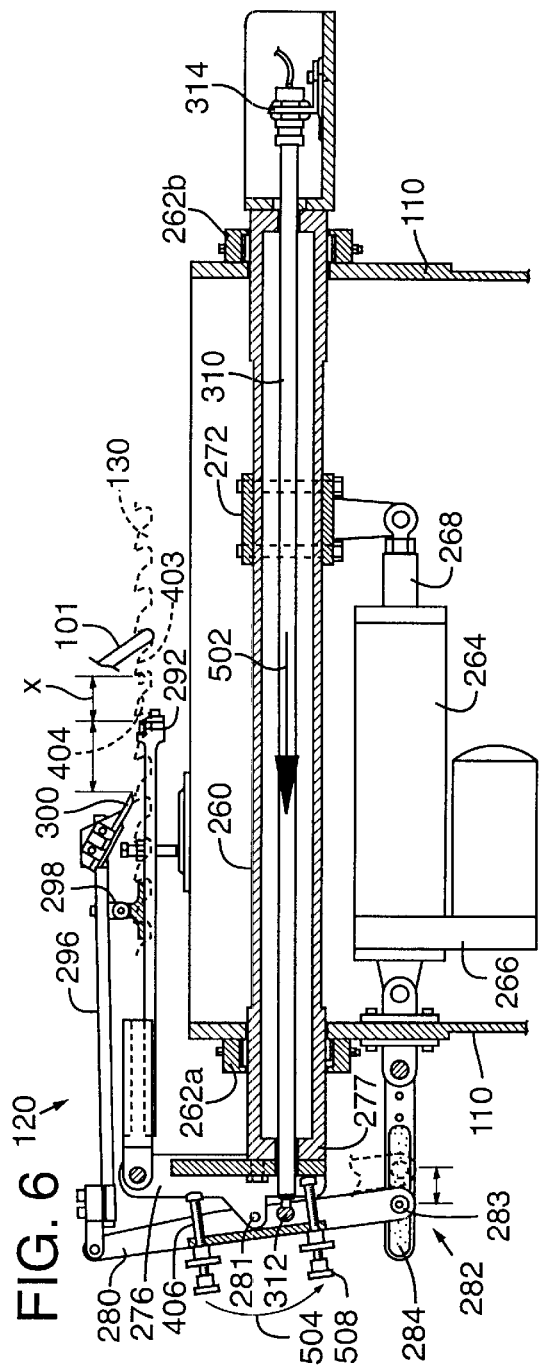

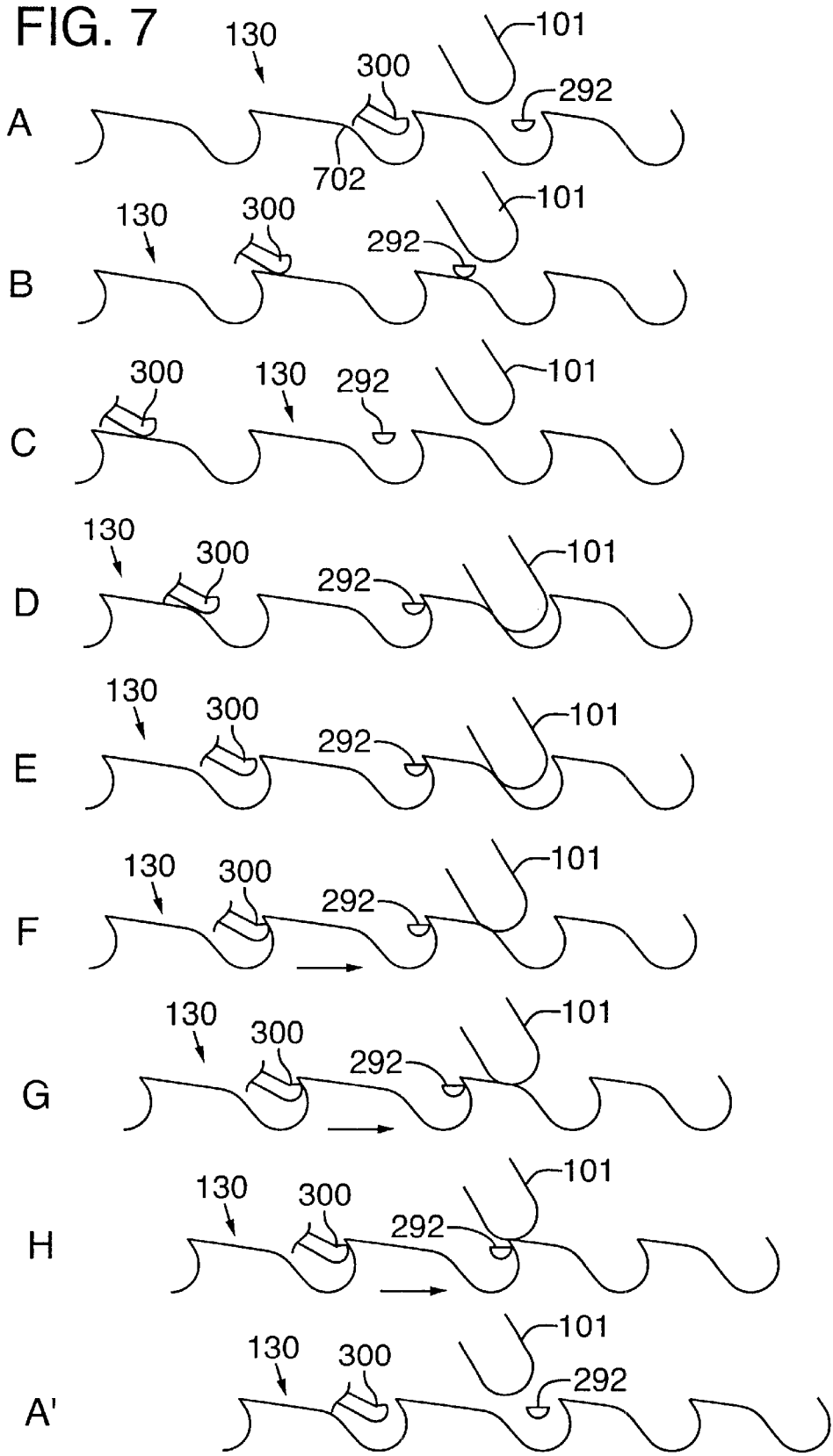

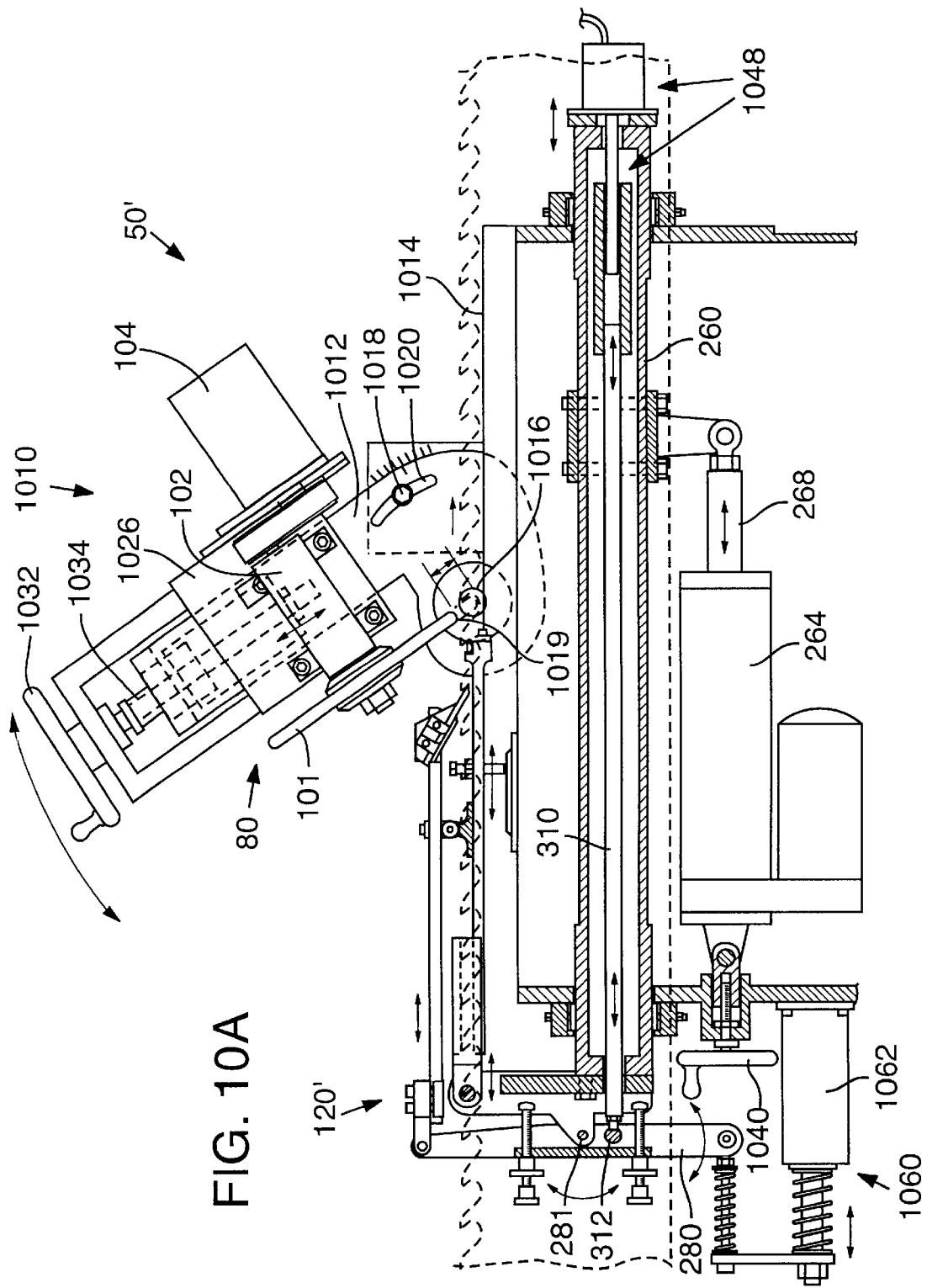

SAW SHARPENING MACHINE WITH PITCH PRE-MEASUREMENT AND FEEDBACK CONTROL FOR SAW BLADE INDEXING

RELATED APPLICATIONS

This application is a continuation and claims the benefit under 35 U.S.C. § 119(e) of U.S. Provisional Application No. 60/257,401, filed Dec. 22, 2000, which is incorporated herein by reference.

TECHNICAL FIELD

This invention relates to devices and methods for sharpening saw blades and, in particular, to a mechanism for accurately indexing and profiling the teeth of band saw blades of the type used in lumber mills. The invention has special utility for band saws with variable pitch tooth spacing.

BACKGROUND OF THE INVENTION

Band saws are used in lumber mills to cut logs into dimensional lumber. Band saw machines use blades that require regular maintenance to eliminate wear. A sharpening operation called "profiling" helps to redefine the profile shape of cutting teeth of the saw blade. Prior-art profiling machines include an indexing mechanism that advances the saw blade into position for sharpening with a grinding wheel that is plunged into a gullet between adjacent teeth of the saw blade to sharpen a cutting face of the tooth. Some prior-art profiling machines then advance the blade and retract the grinding wheel in concert so that a back side of the adjacent tooth is also sharpened. The indexing mechanism and grinding wheel may be driven and timed by a cam assembly or by a CNC controller that operates linear or rotary actuators. In prior-art band saw profiling machines the indexing movement of the blade and the plunging movement of the grinding wheel are regular, requiring minimal set up for most saw blades having a constant pitch. However, newer variable-pitch saw blades have complex tooth spacing patterns, often combined with variable-depth and variable-back angles, that cannot be profiled by prior-art cam-driven machines. CNC-controlled sharpening machines are capable of storing predefined profile programs for variable-pitch saw blades. However, grinding wheel wear, indexing mechanism slip, blade stretch, tolerance stacking, and operator error are all sources of inaccuracy that limit the ability of prior-art machines to sharpen variable-pitch saw blades. Human error in machine setup and slight variations in blade shape are also factors that make it impracticable to implement profiling for variable-pitch saw blades using known machines.

SUMMARY OF THE INVENTION

In accordance with the present invention, a band saw profiling machine includes an indexing mechanism having a feed finger mechanically linked to a caliper finger for reciprocating movement therewith. The caliper finger is urged toward the feed finger during an indexing movement of the indexing mechanism to measure the spacing between adjacent teeth of a band saw blade on-the-fly and concurrently with advancement of the saw blade. The tooth spacing measurement is then used in the band saw sharpening machine to provide feedback for a subsequent indexing movement of the indexing mechanism, to accurately position the band saw blade for sharpening of a row of teeth. A grinding wheel is driven under computer control to plunge toward a centerline of the saw blade and grind a cutting face and gullet of a first tooth of the saw blade while the indexing mechanism retracts. The indexing mechanism then begins to advance the saw blade and measure the spacing between another pair of teeth while the grinding wheel grinds the back side of a second tooth of the saw blade adjacent the first tooth.

A control unit of the sharpening machine can accept input of shape factors from an operator that are used to alter the pattern of motion of the indexing mechanism, the grinding wheel, or both.

Additional aspects and advantages of this invention will be apparent from the following detailed description of preferred embodiments thereof, which proceeds with reference to the accompanying drawings.

BRIEF DESCRIPTION OF THE DRAWINGS

FIG. 5 is a sectional view of the band saw indexing mechanism of FIG. 3 shown being driven so as to advance the band saw blade;

FIG. 6 is a sectional view of the band saw indexing mechanism of FIG. 3 being retracted in preparation for a subsequent indexing operation;

FIG. 7 is a sequence of schematic diagrams A through H and A' depicting a single cycle of the grinding plunge and band saw indexing motion of the respective grinding wheel and indexing mechanism of the band saw sharpening machine of FIG. 1;

FIG. 10A is a partial sectional front elevation showing detail of the band saw indexing mechanism of FIG. 3 and an alternative grinding wheel plunge mechanism and alternative handwheel adjustment mechanisms in accordance with a third preferred embodiment of the present invention;

DETAILED DESCRIPTION OF PREFERRED EMBODIMENTS

Figure 1:
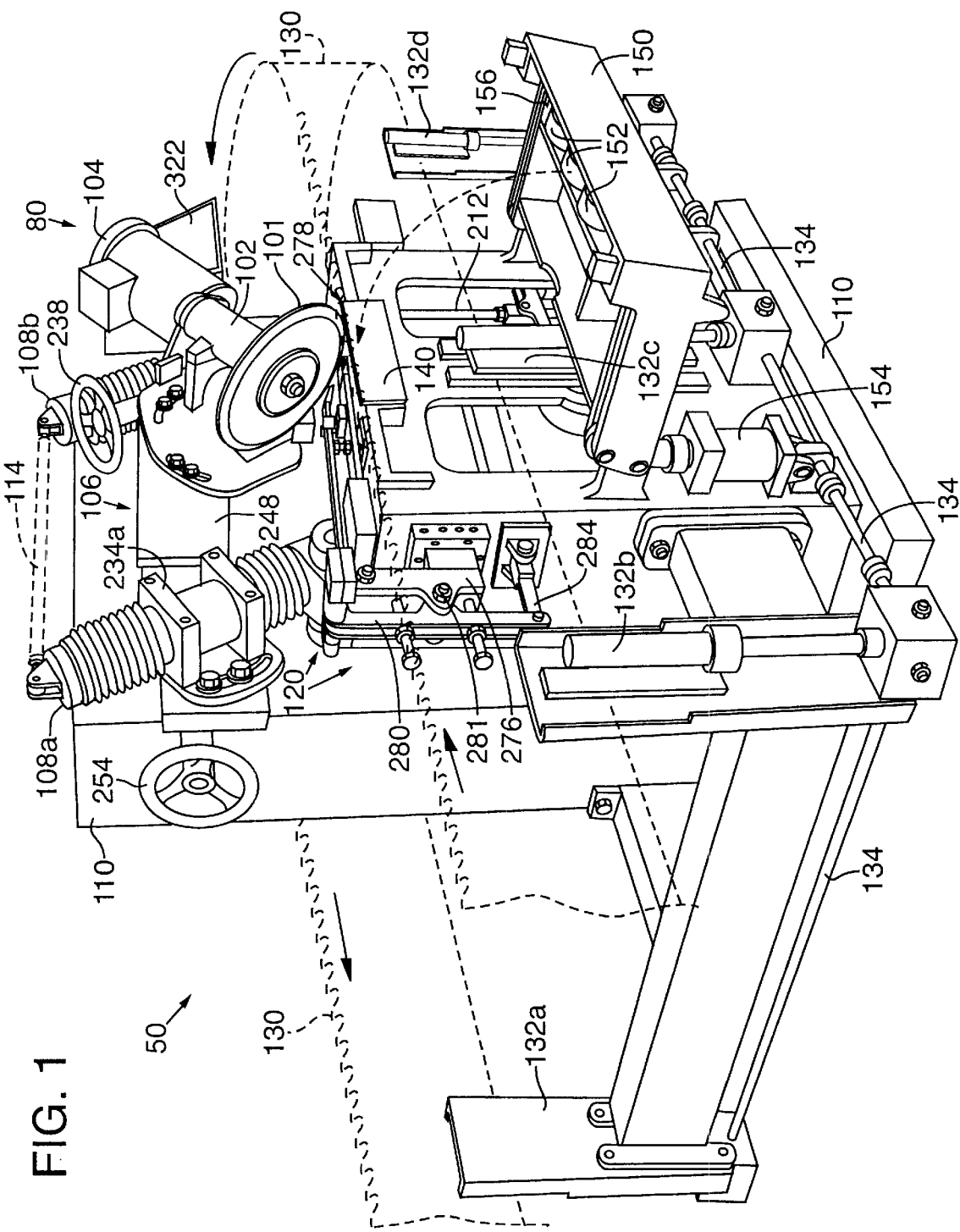
FIG. 1 is a pictorial view of a band saw sharpening machine in accordance with a first preferred embodiment of the present invention.

A band saw sharpening machine 50 in accordance with a first preferred embodiment of the present invention is shown in FIG. 1. With reference to FIG. 1, sharpening machine 50 includes a grinding wheel assembly 80 comprising a grinding wheel 101, a grinding wheel spindle 102, and a motor 104, which are mounted to a carriage 106 of sharpening machine 50. Carriage 106 is slidably supported on a pair of guide bushings 234a and 234b (FIG. 2) that are slidably mounted to a pair of parallel posts 108a and 108b for inclined motion. Posts 108a and 108b are rotatably mounted to a housing 110 of band saw sharpening machine 50 and spaced apart by a fixed distance. A crossbar 114 shown in dashed lines is removably attached to a distal end of posts 108a and 108b during machine setup to ensure parallel alignment of posts 108a and 108b. Band saw sharpening machine 50 also includes an indexing mechanism 120 mounted to housing 110 for generally horizontal reciprocating motion. In operation, a band saw blade 130 is threaded through a group of support stands 132a–132d of band saw sharpening machine 50 that support band saw blade 130 at an operating height. Band saw support stands 132a–132d are mechanically coupled by a set of stand drive shafts 134 that can be rotated either manually or by a motor drive to adjust saw support stands 132a–132d in tandem. Band saw blade 130 is positioned between an anvil 140 and a hinged door 150 of the band saw sharpening machine 50. Door 150 is then closed upon the blade to clamp it firmly against anvil 140 at a height such that cutting teeth 136 of band saw 130 extend just above anvil 140. Adjustable support stands 132 allow the band saw 130 to be positioned to provide maximum support for sharpening, while allowing the grinding wheel to reach the bottom of the gullet between adjacent teeth 136.

Figure 2:
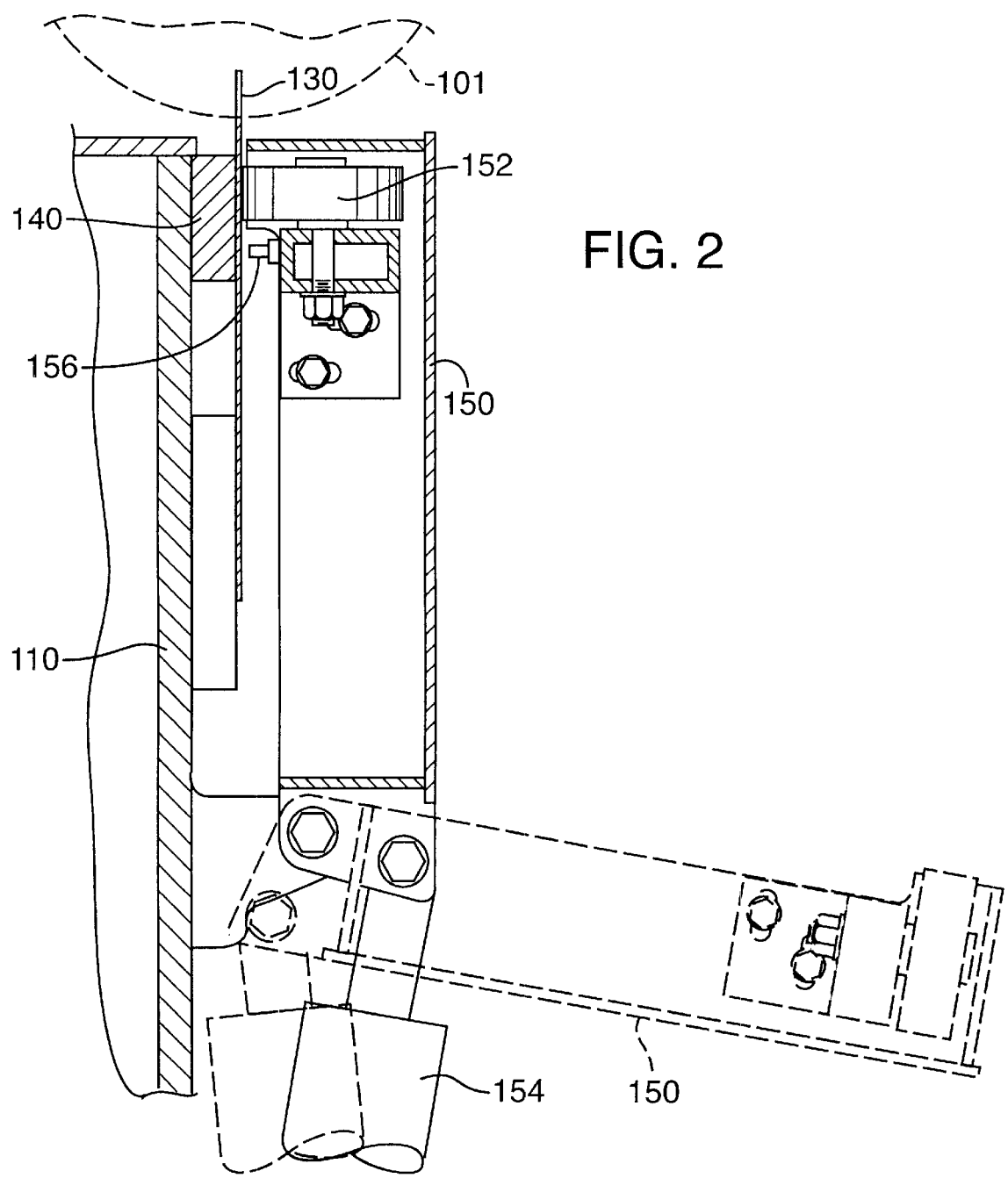
FIG. 2 is a partial sectional side view of the band saw sharpening machine of FIG. 1 taken along line 2—2 of FIG. 3.
Figure 3:
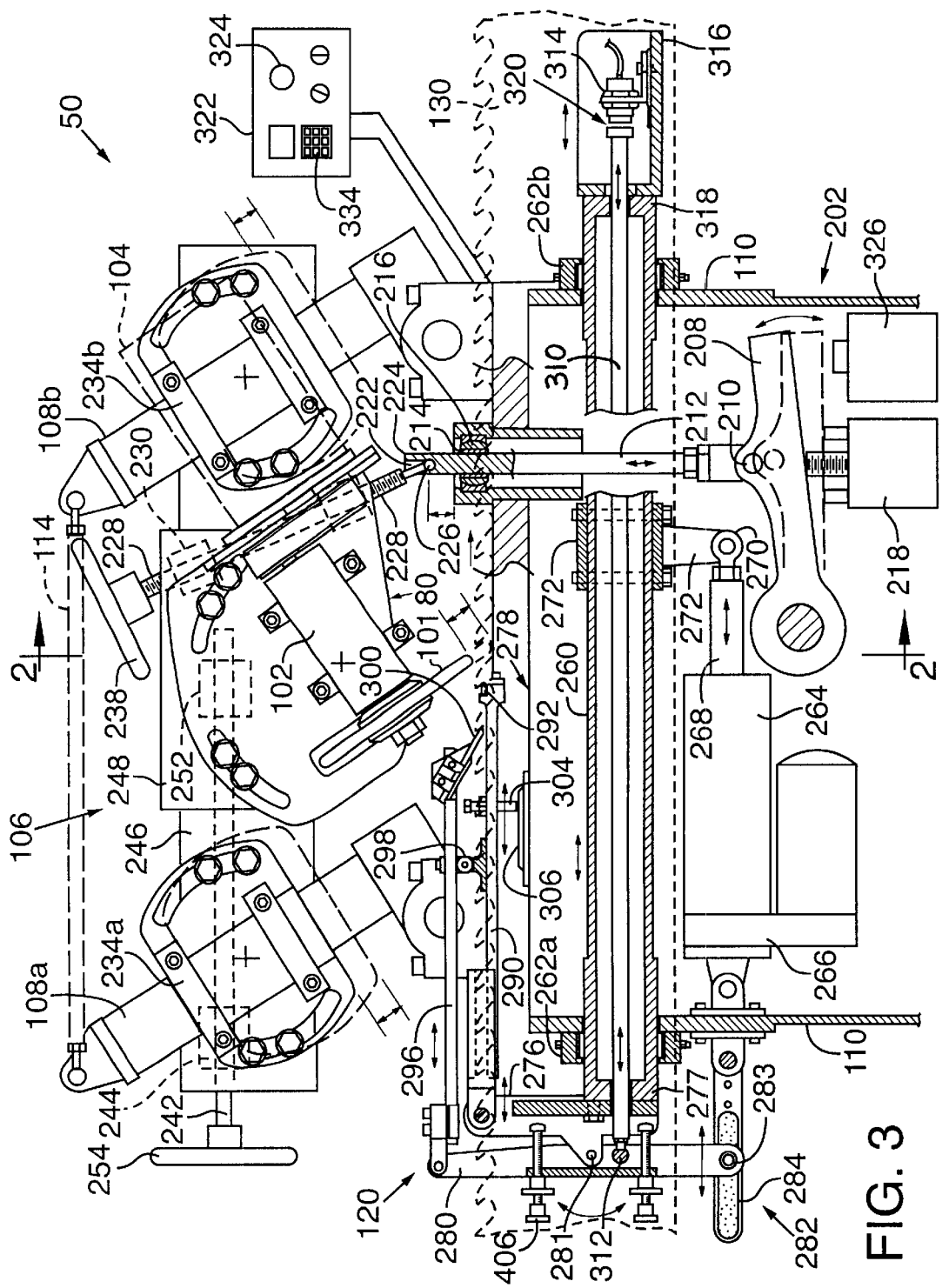
FIG. 3 is a partial sectional elevation of the band saw sharpening machine of FIG. 1, showing detail of a band saw indexing mechanism and a grinding wheel plunge mechanism of the band saw sharpening machine.

FIG. 2 is a sectional side view of band saw sharpening machine 50 of FIG. 1 taken along line 2—2 of FIG. 3. With reference to FIGS. 1 and 2, a set of friction wheels 152 mounted to door 150 engage saw blade 130 when door 150 is closed, to thereby provide clamping force as well as resistance to movement of blade 130. A pair of door pneumatic cylinders 154 (only one shown) are linked to door 150 near its base, A door switch 156 mounted to door 150 triggers air cylinders 154 to extend when door is shut against saw blade 130, to thereby clamp the blade firmly against anvil 140. A release switch (not shown) coupled to a safety interlock (not shown) is manually activated to release pneumatic cylinders 154 when a user desires to open door 150.

FIG. 3 is a partial cross-sectional view of band saw sharpening machine 50 of FIG. 1 showing details of indexing mechanism 120 and a plunge mechanism 202. With reference to FIGS. 1 and 3, plunge mechanism 202 is mechanically linked to carriage 106 for movement of grinding wheel 101 in reciprocating plunge motion along an incline defined by parallel posts 108a and 108b. Plunge mechanism 202 includes a plunge lifter arm 208 hinged to housing 110 at the center of band saw sharpening machine 50. A lift rod 212 is pinned at a first end to a clevis 210 located medially along plunge lifter arm 208. Lift rod 212 is guided by a bushing 214 near its opposite end to allow smooth vertical motion. Bushing 214 is mounted in a spherical bearing 216 to accommodate the slight amount of lateral motion of lift rod 212 induced by plunge lifter arm 208. A driven lift screw 218 is positioned beneath plunge lifter arm 208 to push lift rod 212 upwardly. Retraction of lift screw 218 allows lift rod 212 to fall under gravitational force. Lift rod 212 includes a slot 222 at its distal end 224 sized to receive a ball end 226 of a vertical feed screw 228. Vertical feed screw 228 passes through a threaded block 230 that is pinned to carriage 106. Accordingly, motion imparted by lift screw 218 causes the entire carriage 106, guide bushings 234a and 234b, and grinding wheel assembly 80 to move together along inclined posts 108a and 108b.

A vertical handwheel 238 connected to the end of vertical adjustment screw 228 can be manually turned to impart fine adjustments to the grind depth as grinding wheel 101 wears. A horizontal adjustment screw 242 passes through a threaded block 244 mounted to a structural rail 246 of carriage 106. Horizontal adjustment screw 242 is connected to a trolley 248 of carriage 106 by a bushing block 252. Manual rotation of horizontal feed screw 242 via a horizontal handwheel 254 imparts fine "facing" adjustments to the horizontal position of grinding wheel 101 along structural rail 246 to compensate for wear of grinding wheel 101.

Figure 4:
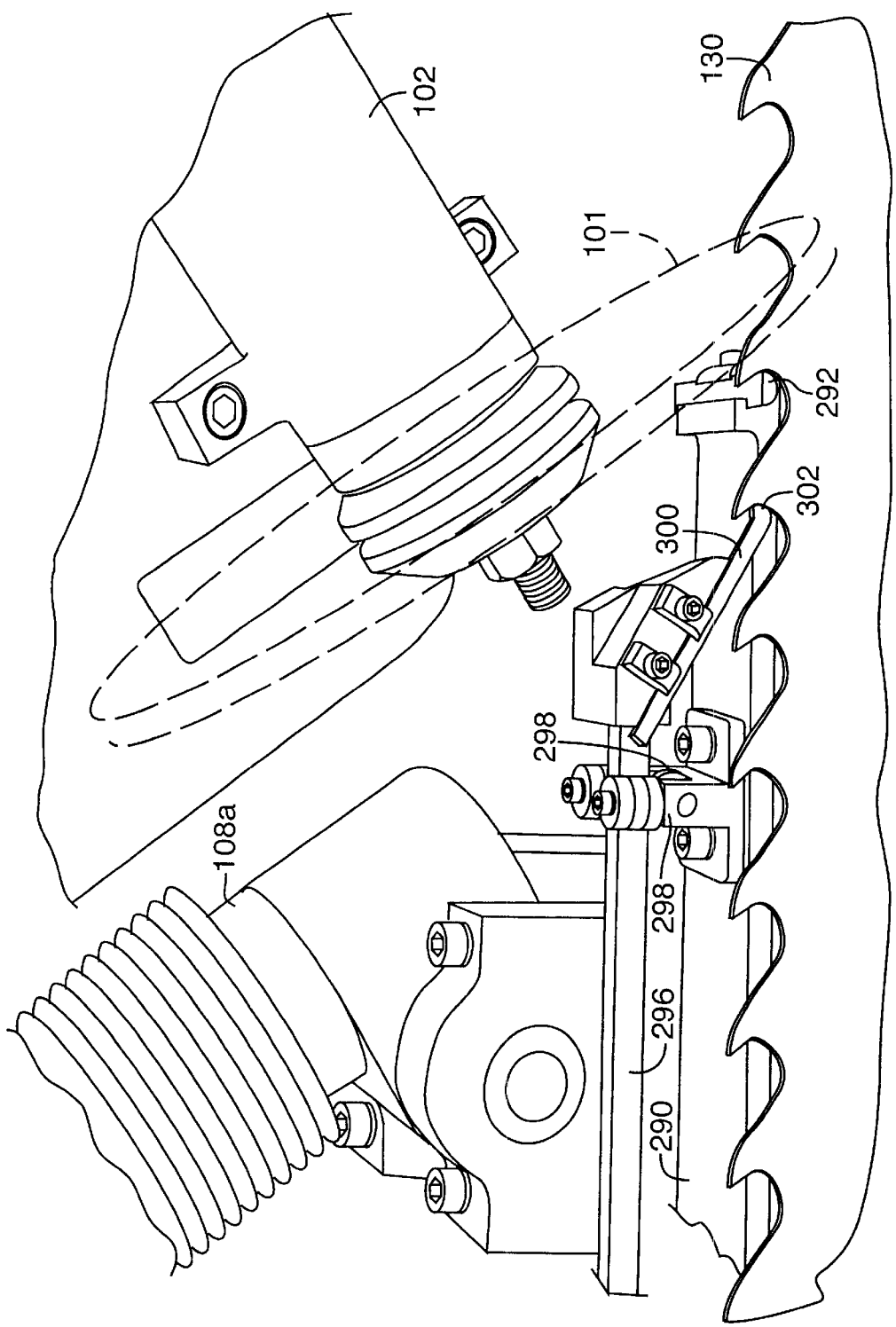
FIG. 4 is an enlarged pictorial view of a working zone of the band saw sharpening machine of FIG. 1.

FIG. 4 is an enlarged fragmentary pictorial view of a working zone of band saw sharpening machine 50 of FIG. 1. With reference to FIGS. 1, 3, and 4, indexing mechanism 120 includes an index drive slide 260 that is slidably supported near its ends by a pair of slide bearings 262a and 262b mounted to the sides of housing 110. A linear indexing actuator 264 includes an actuator body 266 mounted to housing 110 and an actuator drive rod 268 extending from the actuator body 266 for motion in a generally horizontal direction. Actuator drive rod 268 includes a spherical rod end 270 that is rotatably linked to an actuator clamp bracket 272 clamped onto index drive slide 260. Reciprocating motion of linear indexing actuator 264 thus imparts horizontal reciprocating motion to index drive slide 260. An index hinge bracket 276 is securely mounted to a drive end 277 of index drive slide 260 and extends above a work space platform 278 formed by housing 110. A caliper rocker arm 280 is hingedly attached near its middle to index hinge bracket 276 via a rocker hinge 281. Caliper rocker arm 280 is acted on by a drag mechanism 282 that includes a spring-driven friction shoe 283 mounted to caliper arm 280 for dragging against a friction plate 284 when index drive slide 260 is moved horizontally. An index pusher arm 290 is rotatably mounted to index hinge bracket 276 at its proximal end and includes a pusher finger 292 at its distal end. A caliper arm 296 is rotatably mounted at its proximal end to caliper arm rocker 280 opposite drag mechanism 282. Caliper arm 296 is positioned in parallel relationship with index pusher arm 290 and supported by a roller stand 298 mounted to index pusher arm 290. A caliper finger 300 is mounted to the distal end of caliper arm 296 and oriented so that a blade-contacting end 302 of caliper finger 300 is positioned at approximately the same vertical position as pusher finger 292. Pusher finger 292 and caliper finger 300 are preferably made of a wear resistant material, such as carbide or hardened high carbon steel, to minimize wear due to friction against band saw blade 130. A jack bolt 304 is threadably connected to index pusher arm 290 to facilitate height adjustment of index finger 292 and caliper finger 300 to fit band saw blades having teeth of different heights. Jack bolt 304 also serves as a load-bearing member for index pusher arm 290 and caliper arm 296 that slides along a wear plate 306 mounted to work space platform 278.

A gage shaft 310 extends through the center of index drive slide 260 and includes a spherical end 312 that extends beyond drive end 277 of index drive slide 260 to pivotably connect to caliper rocker arm 280. A linear proximity sensor 314 is mounted to a sensor housing 316 that is rigidly connected to a sensor end 318 of index drive slide 260. Proximity sensor 314 is mounted near a gage end 320 of gage shaft 310 to sense the position of gage shaft 310 relative to index drive slide 260.

Proximity sensor 314 is electrically connected to a control unit 322 of band saw sharpening machine 50. Control unit 322 includes software that reads proximity sensor 314 to measure the position of gage end 320 to thereby determine the spacing between pusher finger 292 and caliper finger 300. Control unit 322 includes drive algorithms for generating drive signals applied to lift screw 218 and linear indexing actuator 264. Control unit 322 also performs various setup and safety functions, including an emergency stop button 324 that, when depressed, stops movement of grinding wheel spindle 102, linear indexing actuator 264, lift screw 218, and other powered components of band saw sharpening machine 50. Depressing emergency stop button 324 also causes a safety air cylinder 326 to extend under plunge lifter arm 208 to lift grinding wheel 101 clear of band saw blade 130. A preferred control unit includes an Allen-Bradley® CONTROLLOGIX® Model 5500 controller sold by Rockwell International Corporation, Milwaukee, Wis., USA.

Band saw sharpening machine 50 is designed for easy conversion between right-and left-handed grinding operation, thereby allowing sharpening machine 50 to be assembled in either configuration using nearly all of the same machine components. To reverse the configuration, indexing mechanism 120 and proximity sensor 314 are mounted on opposite ends of index drive slide 260. Similarly, numerous other components of band saw sharpening machine 50 are mounted on the opposite side of housing 110. Parallel posts 108a and 108b are pivoted to the right. Convertibility of band saw sharpening machine 50 reduces the number of parts and manufacturing operations needed to produce both right-handed and left-handed sharpening machines.

FIG. 5 is a sectional view of band saw indexing mechanism 120 of FIG. 3 shown being driven so as to advance band saw blade 130. With reference to FIG. 5, indexing mechanism 120 is driven in a feed stroke by linear index actuator 264 so that index drive slide 260 moves in a feed direction as indicated by arrow 402. Movement of caliper rocker arm 280 in feed direction 402 causes drag mechanism 282 to force caliper arm 296 in feed direction 402 relative to index pusher arm 290 so that caliper finger 300 presses against a cutting face of a second tooth 404 adjacent a first tooth 403 driven by pusher finger 292. During the feed stroke, linear proximity sensor 314 senses the position of gage shaft 310, which indicates the spacing between pusher finger 292 and caliper finger 300 to give an accurate indication of the spacing x between the adjacent first and second teeth 403 and 404. This spacing information is then used in a subsequent feed stroke to accurately position the second tooth for grinding by grinding wheel 101. A forward caliper stop adjustment screw 406 threadably mounted to caliper rocker arm 280 is positioned in proximity to a stop plate 408 of index hinge bracket 276 to limit forward motion of caliper arm 296 relative to index pusher arm 290 and thereby set a minimum spacing between pusher finger 292 and caliper finger 300.

FIG. 6 is a sectional view of band saw indexing mechanism 120 of FIG. 3 being retracted in preparation for a subsequent indexing operation. With reference to FIG. 6, a retraction stroke of indexing mechanism 120 causes actuator drive rod 268 of linear index actuator 264 to retract and move index drive slide 260 in a retraction direction as indicated by arrow 502. Movement of index drive slide in retraction direction 502 causes caliper rocker arm 280 to rock in a direction indicated by arrow 504 as a result of drag mechanism 282. This rocking motion causes caliper finger 300 to retract relative to pusher finger 292, to ensure that caliper finger 300 clears the tooth adjacent pusher finger 292 on the retraction stroke and so that caliper finger 300 will measure the spacing between adjacent teeth on a subsequent feed stroke. A retraction caliper stop adjustment screw 508 is adjustable to ensure that caliper finger 300 retracts far enough to ensure measurement of a tooth in a subsequent feed stroke, but not so far as to skip a tooth (thereby measuring two teeth cumulatively).

Figure 8:
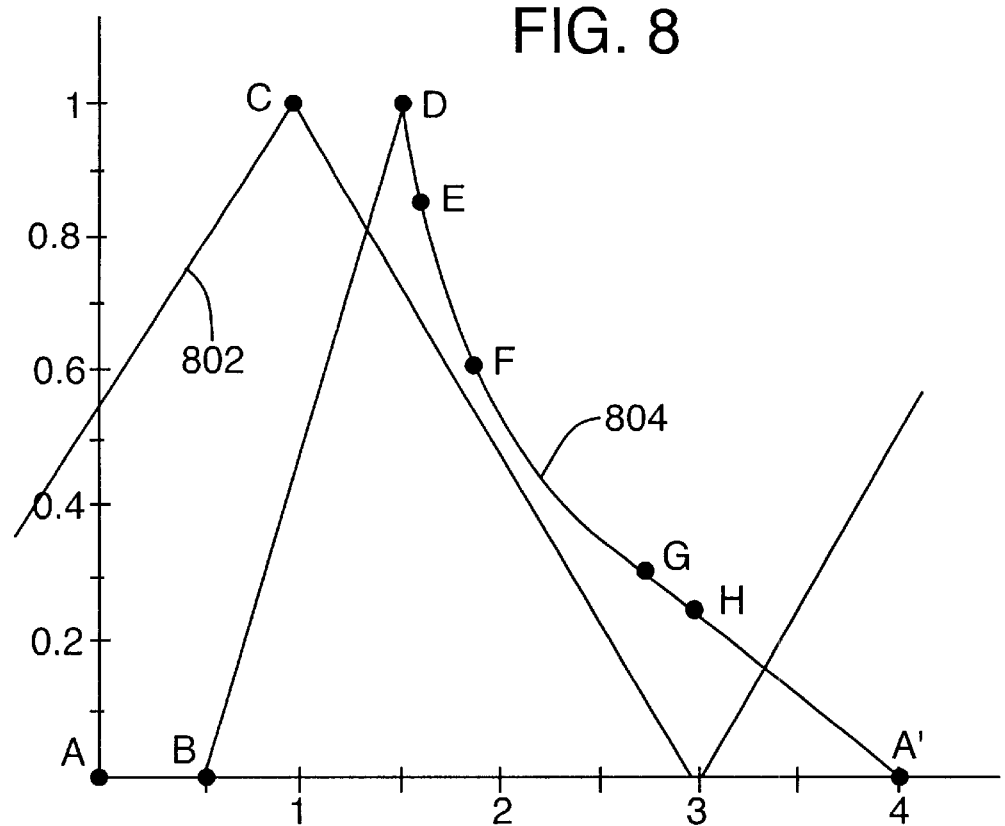
FIG. 8 is a graph of the drive function inputs to the indexing mechanism and the grinding wheel plunge mechanism that produce the sequence of movements shown in FIG. 7.

FIG. 7 is a sequence of schematic diagrams A through H and A' depicting a single grinding plunge cycle and a single band saw indexing cycle of the respective grinding wheel 101 and indexing mechanism 120 of the band saw sharpening machine of FIG. 1. FIG. 8 is a timing graph including an index profile 802 representing the drive function inputs to indexing mechanism 120 and a grind profile 804 representing the drive function inputs to plunge mechanism 202 for producing the sequence of movements shown in FIG. 7. Index profile 802 and grind profile 804 are overlaid to show relative timing of the drive inputs. As indicated by the constant slope of index profile 802, the index cycle, including a feed stroke and a retraction stroke, is made at a constant rate. With reference to FIGS. 7 and 8, diagram "A" marks the beginning of a cycle, as indicated by corresponding point "A" on FIG. 8 and so forth. At time A, pusher finger 292 and caliper finger 300 have already begun their retraction stroke, as indicated in FIG. 8 by the position of index profile 802 along the Y-axis at point A. At time B, pusher finger 292 and caliper finger 300 are retracted further, and grinding wheel 101 begins to plunge, as indicated by the positive slope of grind profile 804 immediately following point B. At time C, pusher finger 292 and caliper finger 300 are fully retracted, while grinding wheel 101 continues its plunge. At time D, grinding wheel 101 has reached the bottom of its plunge stroke, while pusher finger 292 and caliper finger 300 begin to advance for the next index feed stroke. Note, how caliper finger 300 has begun to close the distance between it and pusher finger 292. Diagrams E, F, G, and H show various stages of the grinding cycle, during which saw blade 130 is advanced by pusher finger 292. Because the index stroke is made at a constant rate, a curvature 802 of grind profile 804 determines the shape of a back side 702 of the saw blade tooth. To vary the shape of the back side 702 of the teeth, the operator need only input a different shape factor into control unit 322 for this aspect of the curvature of the grind profile 804. Point A' marks the completion of a full cycle of indexing (and grinding).

Since development and testing of a prototype in accordance with the first preferred embodiment illustrated in FIGS. 1–8, several opportunities for design refinements have been discovered that are believed will lead to improved performance and greater reliability in practice. For example, it has been discovered that use of a constant velocity for either of the index profile (feed stroke) or the grind profile (plunge and lift) results in grinding wheel burn at certain points along the grinding wheel path. As is well known in the art, grinding wheel burn can result in localized case-hardening of the metal in the saw blade, which can result in premature formation of cracks in the saw blade. Optimal results have been achieved using variable drive rates for both the index stroke and the grind stroke to minimize grinding wheel burn.

In addition, it has been discovered that by inputting additional shape factors, it is possible not only to vary the curvature of the back side 702 of the tooth, but to also vary the gullet depth (also known as "tooth height"), the back angle, and the face angle of the teeth. Typically, shape factors are used in control calculations made by control unit 322 to vary these shape characteristics on the fly, optionally as a function of the pitch between adjacent teeth. It is also expected that adjusting the gullet width using similar techniques will also prove to be practical with the present invention. Shape factors for variable-pitch, variable depth, and variable back angle are conveniently input by an operator via a keypad 334 or other interface device of control unit 322 (FIG. 3). Input of shape factors is relatively simple when, for example, variations in gullet depth and back angle are proportional to the spacing between adjacent teeth. However, some commercial variable-pitch saw blades include irregular tooth shape patterns which may repeat in sets of five or seven consecutive teeth, for example. To sharpen saw blades having irregular tooth shape profiles, it may be necessary to input into control unit 322 a somewhat sizable number of shape factors, which may differ from tooth to tooth within each repeating set of teeth. To accommodate irregular tooth shape profiles, it may be preferable to enter shape factors into control unit 322 by uploading a program into a memory of control unit 322, for example using a removable data storage diskette or computer network.

Figure 9:
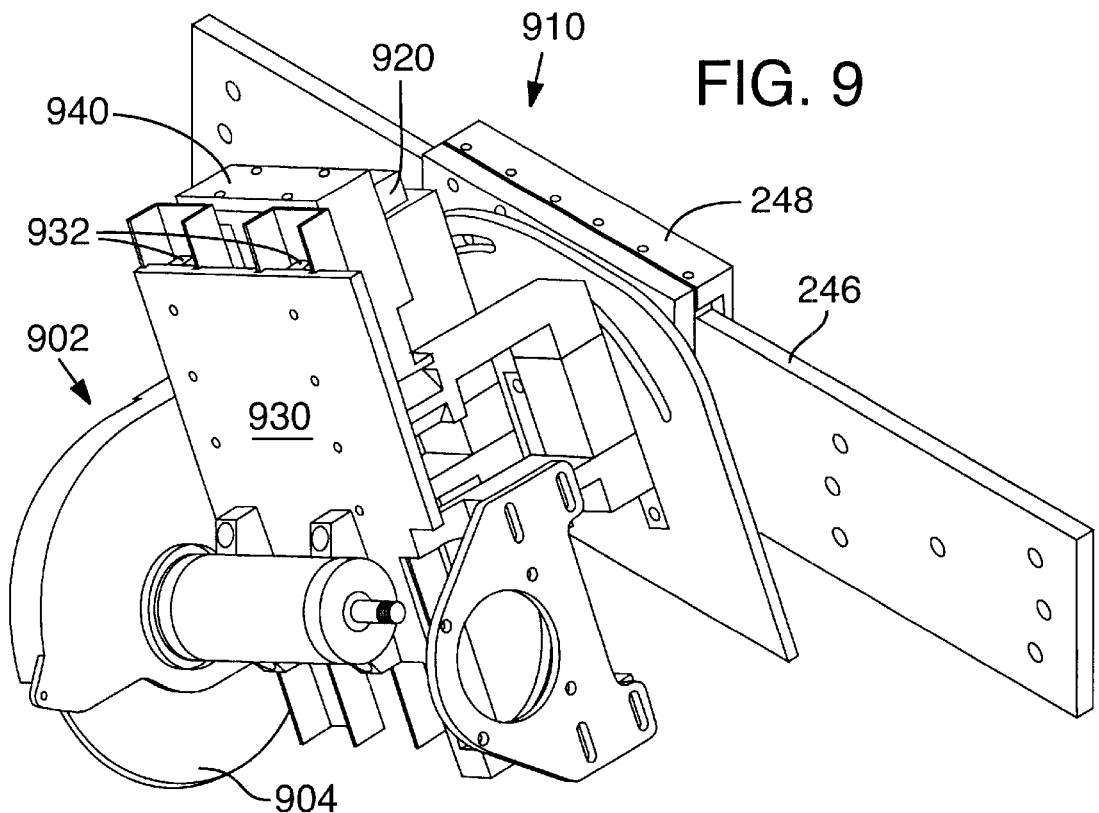
FIG. 9 is a perspective view of a grinding wheel assembly slidably mounted to an alternative carriage assembly of the band saw sharpening machine of FIG. 1 in accordance with a second preferred embodiment of the present invention (a drive motor of the grinding wheel assembly is omitted for clarity)

FIG. 9 is a perspective view of a grinding wheel assembly 902 slidably mounted to an alternative carriage assembly 910 of band saw sharpening machine 50 of FIG. 1, in accordance with a second preferred embodiment of the present invention. The drive motor of grinding wheel assembly 902 has been omitted for clarity, together with posts 108a and 108b, guide bushings 234a and 234b, plunge mechanism 202, indexing mechanism 120, and many other components of band saw sharpening machine 50. Alternative carriage assembly 910 was designed to overcome a drawback of the parallel post design of the first preferred embodiment band saw sharpening machine 50 (FIG. 1), which resulted in binding of carriage assembly during reciprocating movement of grinding wheel assembly 80 along posts 108a and 108b. With reference to FIG. 9, alternative carriage assembly 910 includes the same structural rail 246 and trolley 248 as used in the first preferred embodiment, which remain slidably mounted along posts 108a and 108b to make available the emergency lift function of safety air cylinder 326. However, the plunge motion of grinding wheel 904 is controlled by a linear actuator such as a ball screw mechanism 920 supported by trolley 248 of alternative carriage assembly 910. A grinding wheel slide plate 930 supports grinding wheel assembly 902 and a pair of linear ways 932 guiding two sets of linear bearings (not shown) mounted to support column 940. Ball screw mechanism 920 extends between support column 940 and slide plate 930 via a linkage (not shown) to actuate slide plate for vertical plunging motion of grinding wheel 904. Because slide plate 930 and grinding wheel assembly 902 are much lighter than the entire carriage 910, binding during the plunge motion is avoided.

In an effort to further simplify the carriage and grinding wheel plunge mechanism, a single column design has been conceived for a grinding wheel assembly support and plunge mechanism. FIG. 10 is a partial sectional front elevation showing detail of indexing mechanism 120 of FIG. 3, and showing a single column grinding wheel support 1010 in accordance with a third preferred embodiment of the present invention. With reference to FIG. 10A, grinding wheel support 1010 includes a J-arm 1012 rotatably mounted to a body 1014 of band saw sharpening machine 50' via a journal shaft 1016 extending in a direction perpendicular to indexing mechanism 120'. A lock bolt 1018 may be loosened to allow J-arm 1012 to rotated about journal shaft 1016 to adjust a grinding angle of grinding wheel 101. Journal shaft 1016 is positioned in alignment with a working location 1019 on grinding wheel 101 to minimize lateral movement of working surface 1019 when adjusting the grinding angle. Grinding wheel assembly 80 is securely mounted to a vertical slide plate 1026 mounted to J-arm 1012 for sliding movement therewith along linear bearings (not shown). A linear actuator (not shown) is mounted behind J-arm 1012 and connected to vertical slide plate 1026. A vertical handwheel 1032 connects to a screw assembly 1034 for manual fine adjustment of the grinding depth of grinding wheel 101. To accomplish a facing adjustment, a horizontal handwheel and screw assembly 1040 is coupled to linear indexing actuator 264 so that rotation of horizontal handwheel screw assembly 1040 results in horizontal motion of the entire indexing mechanism 120'.

Indexing mechanism 120' remains in generally the same configuration as indexing mechanism 120 of FIG. 3; however, it includes a linear potentiometer 1048 in place of proximity sensor 314 of FIG. 3. Linear potentiometer 1048 is easily protected from debris by mounting it within index drive slide 260 and has provided greater precision for measurement of tooth spacing than did linear proximity sensor 314. It has also been contemplated that further improvements in measurement accuracy and resolution are likely to be achieved by increasing the distance between rocker hinge 281 and spherical end 312 of gage shaft 310.

Figure 10B:
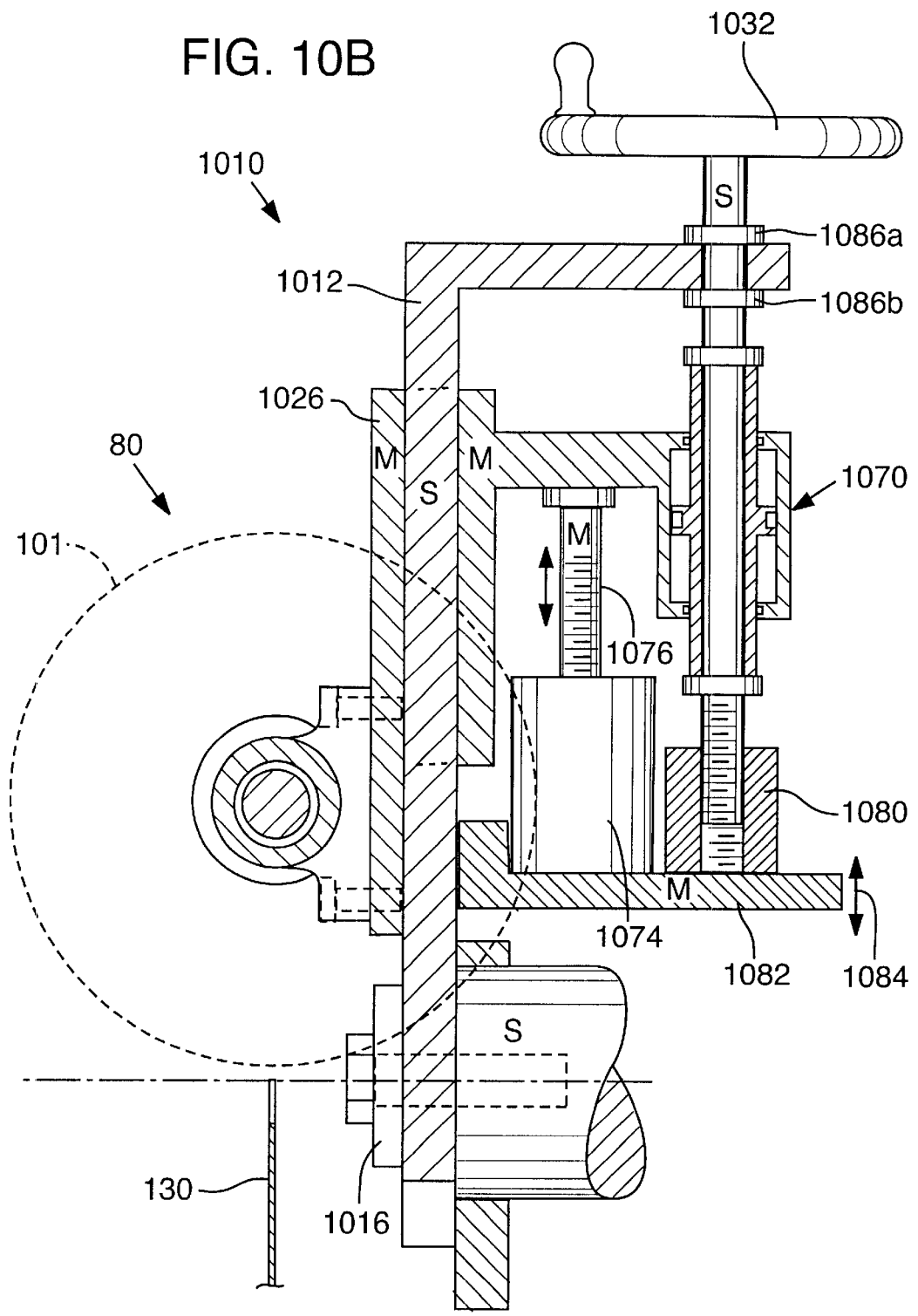
FIG. 10B is a partial sectional side elevation schematic of the grinding wheel plunge mechanism of FIG. 10A.

Drag mechanism 282 of the first preferred embodiment (FIG. 3) is replaced by an alternative drag mechanism 1060 comprised of a passive air cylinder and piston assembly 1062, which has an adjustable exhaust valve (not shown) for controlling the amount of drag force imparted to rocker arm 280 as indexing mechanism 120' is actuated, FIG. 10B is a partial sectional side elevation of single column grinding wheel support mechanism 1010 of FIG. 10A. With reference to FIG. 10B, vertical handwheel adjustment screw assembly 1032 extends through and acts as a piston for a fluid cylinder assembly 1070, which may be pressurized in an emergency to quickly lift vertical slide plate 1026 and grinding wheel assembly 80 away from band saw blade 130. In this schematic side sectional elevational view, moving parts are indicated by a "M", while vertically stationary parts are indicated by the letter "S". In normal operation, a plunge actuator 1074 drives a vertical lift screw 1076 to thereby impart reciprocating vertical motion to vertical slide plate 1026 and grinding wheel assembly 80. During normal operation, fluid cylinder 1070 remains unpressurized. For fine adjustment of the grinding depth, vertical handwheel adjustment screw assembly 1032 can be rotated to cause threaded block 1080 and platform 1082 to move as indicated by arrows 1084. A pair of collars 1086a and 1086b capture handwheel screw assembly 1032 to prevent vertical motion of vertical handwheel screw assembly 1032 relative to J-arm 1012. It should be understood that the schematic side sectional view of FIG. 10B is provided only to illustrate the concept of single column embodiment 1010, and it remains to be proven whether single column grinding wheel support 1010 will be reliable in practice.

Figure 11:
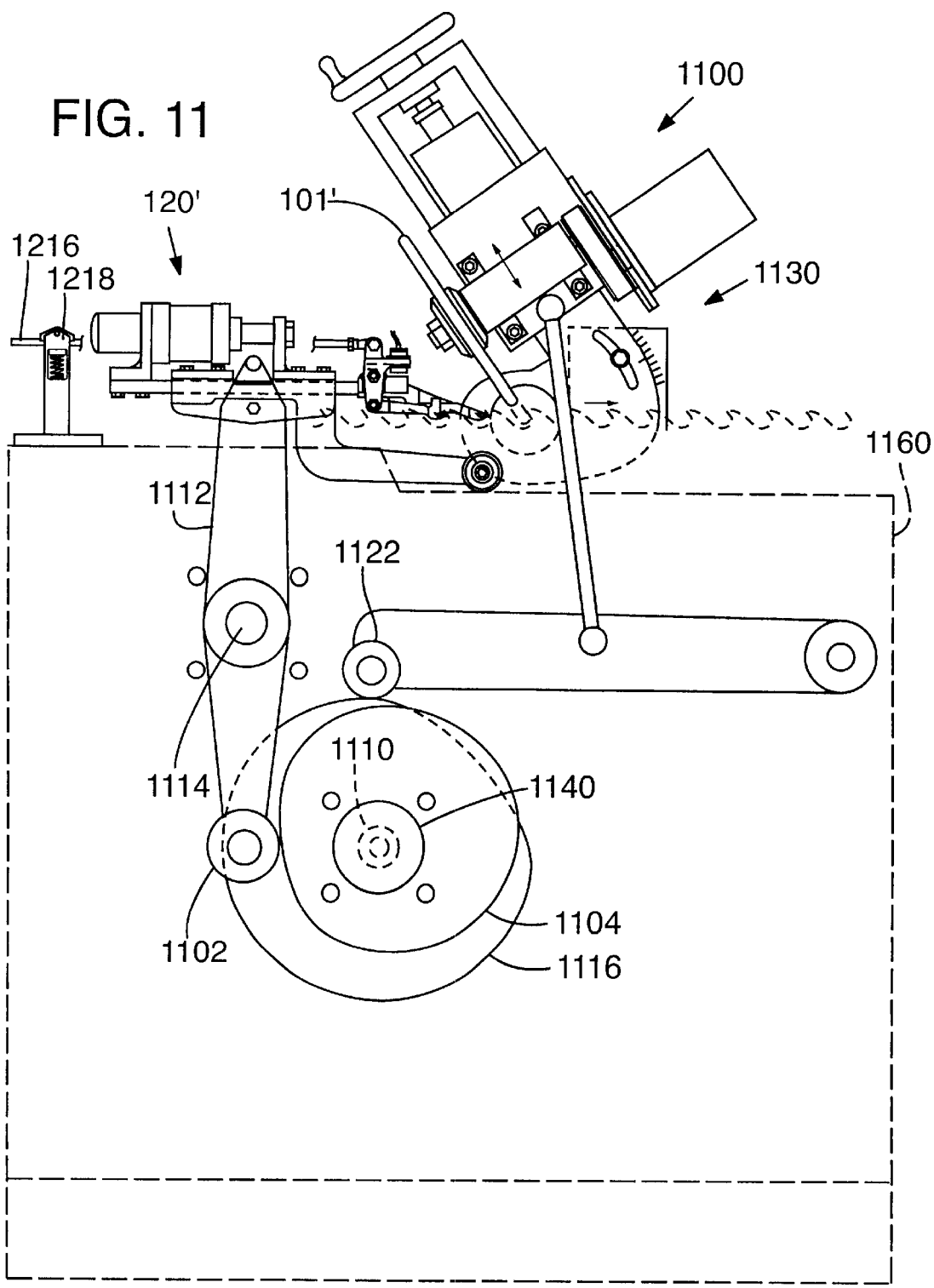
FIG. 11 is a front elevational schematic view showing a cam-driven sharpening machine retrofitted with an indexing feed mechanism in accordance with a fourth preferred embodiment of the present invention.

FIG. 11 is schematic elevational view of a conventional cam-driven band saw profiling machine 1100 retrofitted with a fourth preferred embodiment indexing mechanism 120'. With reference to FIG. 11, indexing mechanism 120' is driven by an indexing cam follower 1102 riding along a peripheral cam surface of an index cam 1104 that is rotated by a central drive shaft 1110. A cam driver arm 1112 pivots about a joint 1114 and mechanically couples index cam 1104 to indexing mechanism 120'. Drive shaft 1110 also rotates a plunge cam 1116 that drives a plunge cam follower 1122 of a plunge mechanism 1130 of saw profiling machine 1100, which is mechanically coupled to a grinding wheel 101'. Index cam 1104 and plunge cam 1116 are shaped and timed relative to each other so as to actuate indexing mechanism 120' and plunge mechanism 1130 in concert.

Figure 12:
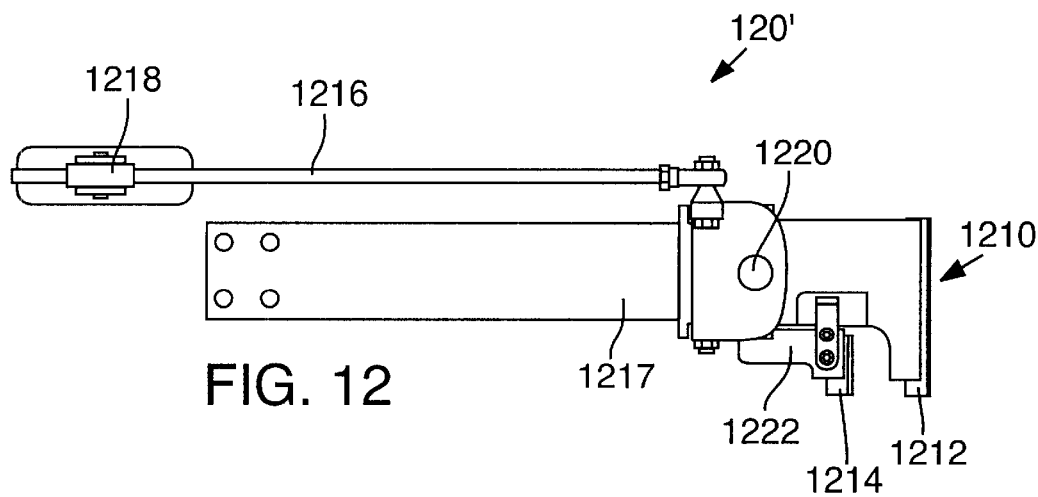
FIGS. 12 and 13 are respective enlarged top plan and enlarged side elevational views of the indexing feed mechanism of FIG. 11.
Figure 13:
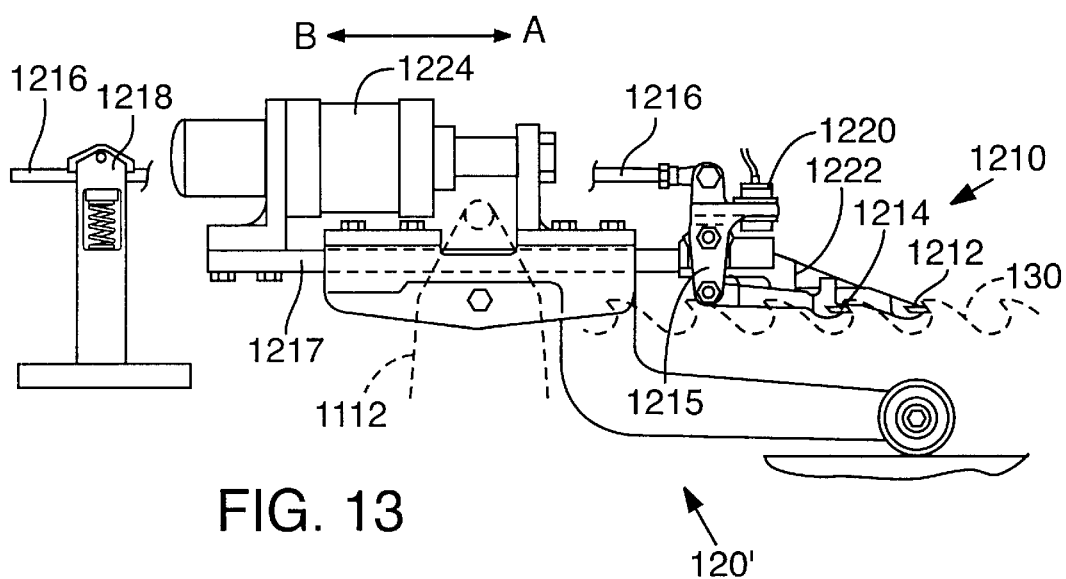

FIGS. 12 and 13 are respective partial top plan and partial side elevation views of blade indexing mechanism 120' of FIG. 11. In the first stage of operation, a mechanically-linked finger assembly 1210, including a drive finger 1212 and a caliper finger 1214, measure the spacing (pitch) of adjacent blade teeth. This finger assembly 1210 is preferably advanced and retracted by cam driver arm 1112 (FIG. 11) or by other means. A drag arm 1216 is connected to caliper finger 1214 via a rocker arm 1215, which is rotatably mounted to a pusher arm 1217 of indexing mechanism 120'. Drag arm 1216 slides through a friction mount 1218, which is mounted to a chassis 1160 (FIG. 11) of profiling machine 1100, to thereby urge caliper finger 1214 toward drive finger 1212 when the drive finger 1212 is advanced in direction "A." As in the first preferred embodiment (FIGS. 1 and 3), the drag mechanism (drag arm 1216 and friction mount 1218) imparts relative motion that allows the finger assembly to measure the spacing of an adjacent pair of blade teeth. A transducer 1220 provides a feedback signal to a control unit (not shown) for measuring the distance between adjacent blade teeth. When finger assembly 1210 is retracted in direction "B," respective caliper and drive fingers 1212 and 1214 are caused to spread apart. A stop 1222 limits the opening movement of caliper finger 1214 during retraction.

In a second stage of operation, blade 130 is advanced longitudinally while the blade profile is ground by grinding wheel 101'. The control unit controls a short stroke linear actuator 1224 to adjust the drive stroke (relative to the fixed stroke drive profile defined by index cam 1104) in response to the tooth spacing measurement made during the previous stroke. The plunging motion of grinding wheel 101' may be kept regular, while the distance, velocity, and timing of the saw blade movement is controlled (by the control unit and linear actuator 1224) to match the grinding profile to the blade's pitch and profile shape. A shaft encoder 1140 (FIG. 11) provides timing information to the control unit so that adjustments via linear actuator 1224 are timed properly relative to the plunging motion of plunge mechanism 1130 and grinding wheel 101'.

Those skilled in the art will appreciate that the indexing mechanism and saw sharpening technology of the present invention could easily be extended to a sharpening machine for circular saws. While not described in detail herein, a sharpening machine for a circular saw would include a rotatable arbor for mounting the circular saw and a drag mechanism for resisting movement imparted by an indexing mechanism in accordance with the present invention. Various other modifications would likely be necessary to apply the invention in the context of a circle saw sharpening machine. However, such changes would be readily apparent to anyone of skill in the art attempting to implement the invention for such purpose.

It will be obvious to those having skill in the art that many other changes may be made to the details of the above-described embodiments of this invention without departing from the underlying principles thereof. For example, an indexing mechanism embodying the on-the-fly pitch pre-measurement function of the present invention could be modified to pull the saw blade during the feed stroke, rather than push it. The scope of the present invention should, therefore, be determined only by the following claims.

What is claimed is:

1. In a saw sharpening machine of the type including a base adapted to support a saw blade for movement relative thereto and a grinding wheel mounted to the base, the grinding wheel driven for reciprocating movement relative to the saw blade, the saw blade including multiple teeth spaced apart along the saw blade, an improved indexing mechanism comprising:
    an indexing actuator;
    a feed finger driven to reciprocate by the indexing actuator for multiple indexing cycles, each indexing cycle comprising a feed stroke and a retraction stroke, the feed stroke including movement of the feed finger in a first direction for advancing the teeth of the saw blade and the retraction stroke including movement of the feed finger in a second direction opposite the first direction for resetting the index mechanism, the feed finger contacting a first tooth of a the saw blade during movement in the first direction and retracting past a second tooth of the saw blade adjacent the first tooth during movement in the second direction;
    a caliper finger mechanically linked to the feed finger for reciprocating movement therewith;
    a drag mechanism mechanically linked to the caliper finger, the drag mechanism urging the caliper finger closer to the feed finger during movement of the feed finger in the first direction so that the caliper finger presses against the second tooth during advancement of the saw blade;
    a sensor coupled to the caliper finger and the feed finger for measuring a pitch distance between the first and second teeth during movement in the first direction; and
    a control unit coupled to the sensor and the indexing actuator, the control unit including a feedback loop for controlling the feed stroke based on the pitch distance measured during a previous feed stroke, and to thereby accurately position the teeth of the saw blade for sharpening by the grinding wheel.

2. The saw sharpening machine of claim 1, further comprising a rocker arm mechanically linking the caliper finger to the drag mechanism, the rocker arm mounted for rotation about a rocker hinge located medially of the rocker arm between the caliper finger and the drag mechanism.

3. The saw sharpening machine of claim 1 in which the drag mechanism urges the caliper finger away from the feed finger during the retraction stroke so that the caliper finger retracts past a third tooth of the saw blade adjacent the second tooth.

4. The saw sharpening machine of claim 1 in which the indexing actuator includes a linear actuator.

5. The saw sharpening machine of claim 1 in which the indexing actuator includes a rotary cam drive mechanism.

6. The saw sharpening machine of claim 1 in which the drag mechanism includes an air cylinder.

7. The saw sharpening machine of claim 1 in which at least some of the sharpening of the saw blade is performed concurrently with advancement of the saw blade during the feed stroke.

8. The saw sharpening machine of claim 1 in which:
    the movement of the grinding wheel is coordinated with the advancing of the saw blade to define a sharpening path for sharpening a profile of the saw blade; and
    the control unit is adapted to receive shape factors used for adjusting a driving profile of one or both of the index mechanism and the grinding wheel, to thereby allow the sharpening path to be customized to fit the profile of the saw blade.

9. The saw sharpening machine of claim 8 in which the shape factors selectively include a gullet depth factor proportional to the spacing between adjacent teeth, the control unit responsive to the pitch distance measured by the sensor for adjustment of the gullet depth factor, to thereby accommodate sharpening of variable pitch blades having tooth heights proportional to the spacing between adjacent teeth.

10. The saw sharpening machine of claim 8 in which the control unit includes a program memory for storing an irregular driving profile for sharpening a saw blade having an irregular tooth shape.

11. The saw sharpening machine of claim 1 in which the sensor includes a linear potentiometer.

12. The saw sharpening machine of claim 1, further including a blade drag mechanism for providing frictional resistance to advancement of the saw blade by the feed finger.

13. The saw sharpening machine of claim 1, further including
a carriage assembly supporting the grinding wheel; and
a handwheel screw adjustment mechanically linked to the carriage assembly for manually adjusting the position of the grinding wheel relative to the saw blade, and to thereby compensate for wear of the grinding wheel.

14. A machine for sharpening a saw blade having multiple teeth spaced apart along the saw blade, comprising:
a saw blade support adapted to movably support a saw blade;
a grinding wheel driven for reciprocating movement relative to the saw blade for plunging toward and sharpening the teeth of the saw blade; and
a indexing mechanism for indexing the saw blade so that its teeth are successively positioned for sharpening by the grinding wheel, the indexing mechanism including:
an indexing actuator,
a feed finger driven by the indexing actuator to reciprocate for multiple indexing cycles, each indexing cycle comprising a feed stroke and a retraction stroke, the feed stroke including movement of the feed finger in a first direction for advancing the saw blade and the retraction stroke including movement of the feed finger in a second direction opposite the first direction for resetting the index mechanism, the feed finger contacting a first tooth of a the saw blade during movement in the first direction and retracting past a second tooth of the saw blade adjacent the first tooth during movement in the second direction,
a caliper finger mechanically linked to the feed finger for reciprocating movement therewith,
a drag mechanism mechanically linked to the caliper finger, the drag mechanism urging the caliper finger closer to the feed finger during movement of the feed finger in the first direction so that the caliper finger presses against the second tooth during advancement of the saw blade,
a sensor coupled to the caliper finger and the feed finger for measuring a pitch distance between the first and second teeth during movement in the first direction, and
a control unit coupled to the sensor and the indexing actuator, the control unit including a feedback loop for control the feed stroke based on the pitch distance measured during a previous feed stroke, and to thereby accurately position the teeth of the saw blade for sharpening by the grinding wheel.

15. The machine of claim 14, further comprising a rocker arm mechanically linking the caliper finger to the drag mechanism, the rocker arm mounted for rotation about a rocker hinge located medially of the rocker arm between the caliper finger and the drag mechanism.

16. The machine of claim 14 in which the drag mechanism urges the caliper finger away from the feed finger during the retraction stroke so that the caliper finger retracts past a third tooth of the saw blade adjacent the second tooth.

17. The machine of claim 14 in which the indexing actuator includes a linear actuator.

18. The machine of claim 14 in which the indexing actuator includes a rotary cam drive mechanism.

19. The machine of claim 14 in which the drag mechanism includes an air cylinder.

20. The machine of claim 14 in which at least some of the sharpening of the saw blade is performed concurrently with advancement of the saw blade during the feed stroke.

21. The machine of claim 14 in which:
the movement of the grinding wheel is coordinated with the advancement of the saw blade to define a sharpening path for sharpening a profile of the saw blade; and
the control unit is adapted to receive shape factors used for adjusting a driving profile of one or both of the index mechanism and the grinding wheel, to thereby allow the sharpening path to be customized to fit the profile of the saw blade.

22. The machine of claim 21 in which the shape factors selectively include a gullet depth factor that is proportional to the spacing between adjacent teeth, the control unit responsive to the pitch distance measured by the sensor for adjustment of the gullet depth factor, to thereby accommodate sharpening of variable pitch blades having tooth heights proportional to the spacing between adjacent teeth.

23. The machine of claim 21 in which the control unit includes a program memory for storing an irregular driving profile for sharpening a saw blade having an irregular tooth shape.

24. The machine of claim 14 in which the sensor includes a linear potentiometer.

25. The machine of claim 14, further including a blade drag mechanism for providing frictional resistance to advancement of the saw blade by the feed finger.

26. The machine of claim 14, further including
a carriage assembly supporting the grinding wheel; and
a handwheel screw adjustment mechanically linked to the carriage assembly for manually adjusting the position of the grinding wheel relative to the saw blade, and to thereby compensate for wear of the grinding wheel.

27. A method of sharpening a saw blade having multiple spaced apart teeth having a profile, comprising:
movably supporting the saw blade;
providing a grinding wheel mounted for reciprocating movement relative to the saw blade;
providing a feed finger sized to contact the teeth of the saw blade;
driving the feed finger to reciprocate for multiple indexing cycles, each indexing cycle comprising a feed stroke and a retraction stroke, the feed stroke including moving the feed finger in a first direction for advancing the saw blade and the retraction stroke including moving the feed finger in a second direction opposite the first direction, the feed finger contacting a first tooth of a the saw blade during movement in the first direction and retracting past a second tooth of the saw blade adjacent the first tooth during movement in the second direction;
providing a caliper finger mechanically linked to the feed finger for reciprocating movement therewith;

urging the caliper finger closer to the feed finger during the feed stroke so that the caliper finger presses against the second tooth as the saw blade is advanced;

during the feed stroke of each indexing cycle, measuring the position of the feed finger relative to the caliper finger to determine a pitch distance between the first and second teeth;

providing a feedback loop for controlling the feed stroke based on the pitch distance determined during a previous feed stroke, to thereby accurately advance the teeth into position for sharpening by the grinding wheel; and moving the grinding wheel in concert with advancing of the saw blade to thereby sharpen the profile of the teeth of the saw blade.

28. A device for machining a band saw blade, comprising:

a machining tool;

a drive assembly for driving the machining tool to reciprocate relative to a band saw blade;

a reciprocating indexing mechanism for advancing the band saw blade in a feed stroke so that it is positioned for machining by the machining tool;

a measurement mechanism mechanically coupled to the indexing mechanism for measuring a dimension of the band saw during the feed stroke of the indexing mechanism;

a computer control unit coupled to the measurement mechanism, the computer control unit providing feedback to one of the drive assembly, the indexing mechanism, or both, in response to the dimension measured by the measurement mechanism, and to thereby accurately advance the band saw into position for sharpening by the grinding wheel based on a pre-measurement of the dimension of the band saw blade.

29. The device of claim 28 in which the machining tool includes a grinding wheel.

30. The device of claim 28 in which at least some of the machining is performed concurrently with the feed stroke.

31. The device of claim 28 in which the dimension of the band saw blade is a pitch distance between two teeth of the band saw blade.

* * * * *

UNITED STATES PATENT AND TRADEMARK OFFICE
CERTIFICATE OF CORRECTION

PATENT NO. : 6,631,658 B2
DATED : October 14, 2003
INVENTOR(S) : Ernest W. Brown It is certified that error appears in the above-identified patent and that said Letters Patent is hereby corrected as shown below:

Column 1,
Line 7, delete "is a continuation and".

Column 3,
Line 39, "base," should read -- base. --.

Column 5,
Line 19, "right-and left-handed" should read -- right- and left-handed --.

Column 7,
Line 66, "to rotated" should read -- to rotate --.

Column 8,
Line 32, "actuated," should read -- actuated. --.

Column 10,
Lines 16 and 65, "index mechanism" should read -- indexing mechanism --;
Line 17, "tooth of a the" should read -- tooth of the --.

Column 11,
Line 32, "a indexing" should read -- an indexing --;
Line 43, "index mechanism" should read -- indexing mechanism --;
Line 44, "tooth of a the" should read -- tooth of the --; and
Line 62, "control" should read -- controlling --.

Column 12,
Line 23, "index mechanism" should read -- indexing mechanism --; and
Line 62, "tooth of a the" should read -- tooth of the --.

UNITED STATES PATENT AND TRADEMARK OFFICE
CERTIFICATE OF CORRECTION

PATENT NO. : 6,631,658 B2
DATED : October 14, 2003
INVENTOR(S) : Ernest W. Brown It is certified that error appears in the above-identified patent and that said Letters Patent is hereby corrected as shown below:

<u>Column 14,</u>
Lines 3-4, insert -- and -- after "indexing mechanism;".

Signed and Sealed this

Fifth Day of October, 2004

JON W. DUDAS
*Director of the United States Patent and Trademark Office*